UNITED STATES PATENT OFFICE 2,260,081

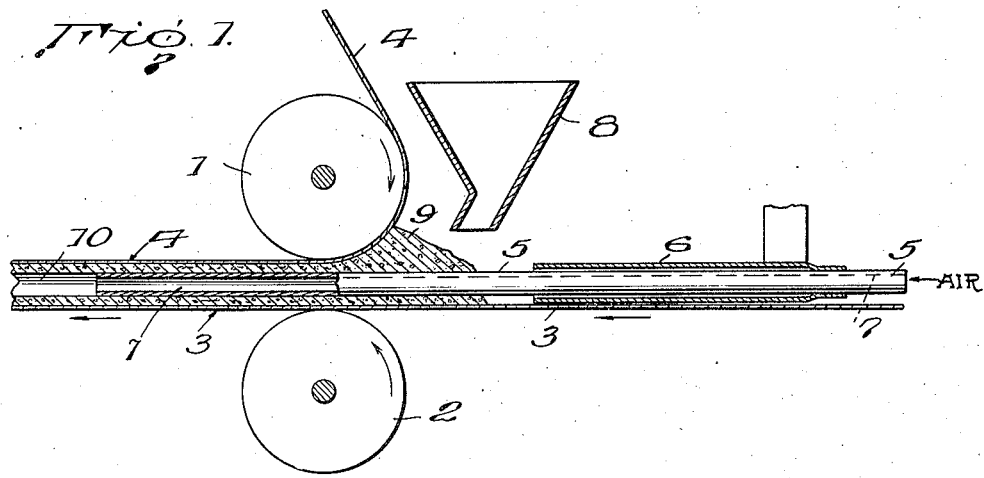
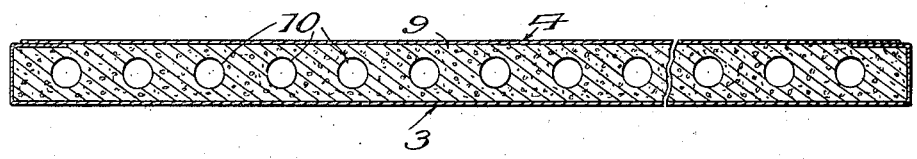
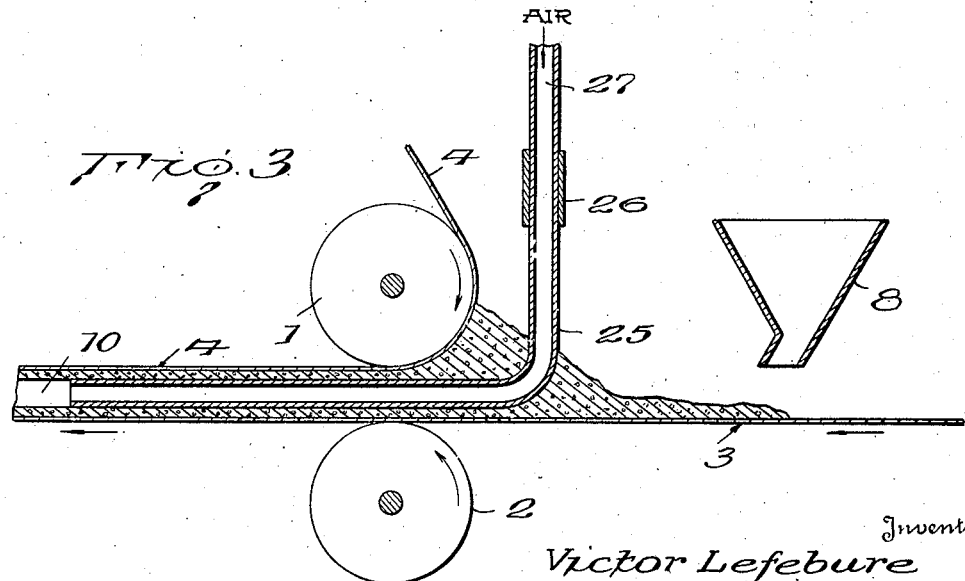

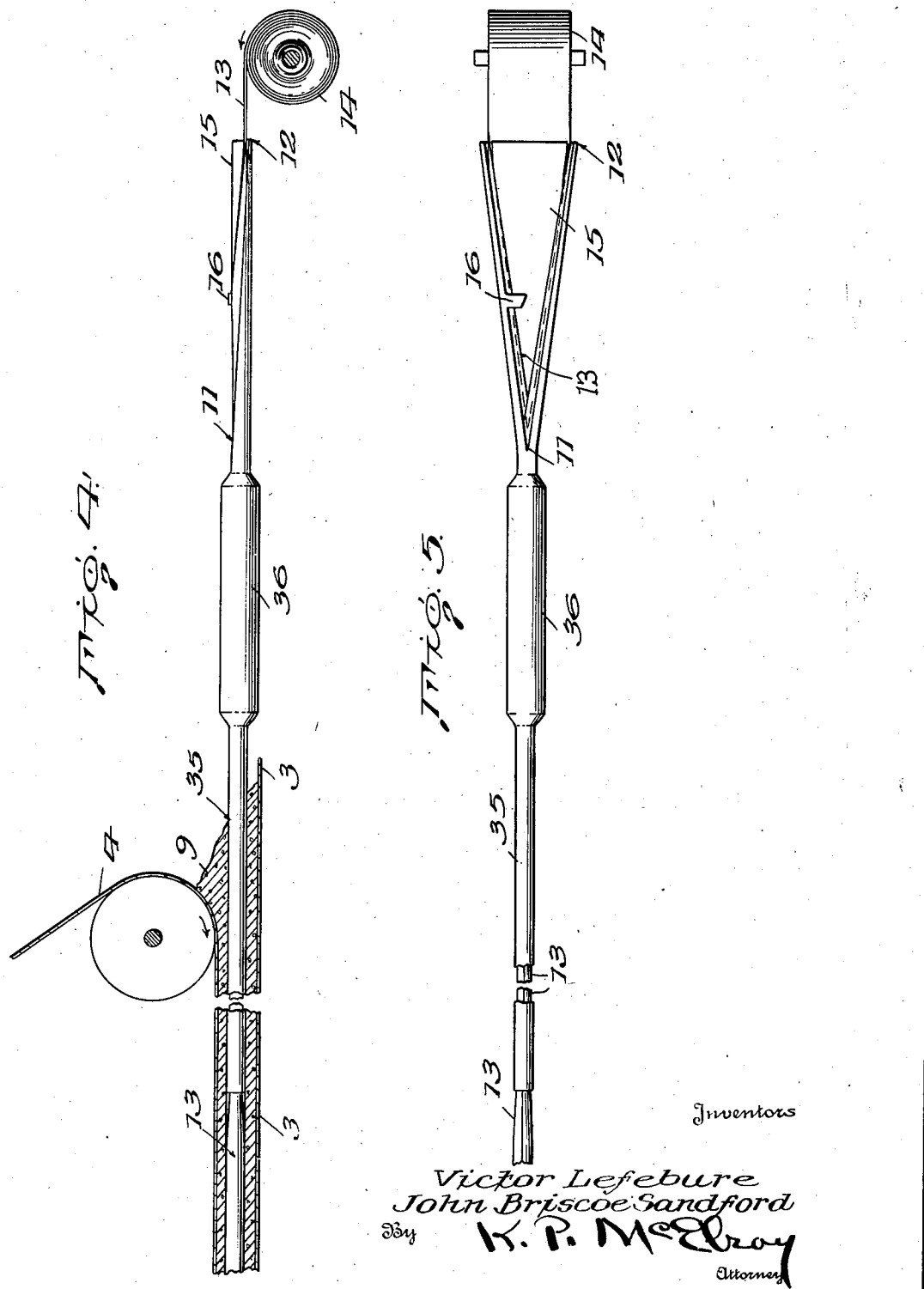

MOLDING OF SHEETS FROM PLASTIC MASSES

Victor Lefebure, London, and John Briscoe Sandford, Norton-on-Tees, England, assignors to Imperial Chemical Industries Limited, a corporation of Great Britain Application March 23, 1939, Serial No. 263,760
In Great Britain March 25, 1938

4 Claims. (Cl. 25—155)

This invention relates to the molding of plastic masses by continuous methods, and more particularly to the molding by continuous methods of plastic masses having interior cavities, and to apparatus useful in performing such methods.

Plaster board, plaster blocks and similar plastic masses can be formed by the passage of the plaster between a pair of superposed horizontal rolls set at a distance apart equal to the desired thickness of the finished article. When making plaster board one liner is fed horizontally over the bottom roll, and if two liners are being used the other is fed under the top roll, the wet plaster mix being applied to the bottom liner just before the rolls and in sufficient quantity to fill the available cross-section between the liners at the nip of the rolls. Plaster blocks can be made continuously by a similar method, and if liners are not required travelling bands can be used in their place. After passing between the rollers the plaster is carried forward as a continuous mass, after travelling a certain distance the mass sets and convenient lengths of formed board or formed block can be cut from the moving mass.

For most purposes plaster boards are required in units of fairly large size e. g. 12 feet by 4 feet, and normally these become difficult to handle because of their weight if their thickness exceeds half an inch. There are however many purposes for which thicker boards are desirable.

Up to the present attempts to produce low density wall boards have been confined to the use of fillers such as sawdust and of cellular plaster mixes such as are obtained by incorporating foam in the mix or by chemically generating a gas therein. With fillers the density of a typical board can be reduced for instance from 2 lbs. per sq. foot to about 1.7 lbs. per sq. foot, but any attempt to reduce the density beyond this point by adding a greater percentage of filler leads to considerable loss of strength of the core and poor adhesion between the core and the liners. The use of cellular plaster allows of considerable reduction of density but here again there is loss of strength and the drawback of poor adhesion to the liners. Since the strength of plaster board depends essentially upon the firmness of the bond between the core and the liners the reduction in density that can be attained with fillers or cellular plaster is limited for practical purposes. Lightness is also desirable with plaster blocks if this can be achieved without serious loss of strength. Suggestions have been made in the past to make light weight blocks and boards by moulding the boards or blocks over metal rods or similar articles and withdrawing the rods after the set has been achieved. Such a process is inapplicable to a continuous method and is difficut and costing to operate.

This invention has as an object to provide strong, light-weight plastic masses. A further object is to devise a method and apparatus whereby strong, light-weight plastic masses can be manufactured by a continuous process. A still further object is to devise a method and apparatus whereby plastic masses having internal cavities can be manufactured by a continuous process. A still further object is to devise a method and apparatus whereby plaster board with internal cavities can be manufactured by a continuous process. Further objects will appear hereinafter. These objects are accomplished by the following invention.

We have found that we can produce a plastic mass with internal cavities by a continuous method if the plastic mass is caused to flow, while setting, over a rod or a number of rods, extending parallel with the direction of movement of the setting mass and terminating within the same, so that cavities are produced as the mass leaves the ends of the rods. Air is allowed to have free access to the cavities so as to minimise the tendency for the cavity walls to collapse. This may be arranged by keeping the forward ends of the cavities open or by having longitudinal air passages through the rods.

With the plaster mixes ordinarily used in the manufacture of plaster boards and blocks, and when using top and bottom liners or travelling bands, it is only necessary that the rods extend into the plaster to a point beyond that where the turbulence caused by passing between the rollers has ceased. If, however, the mix is apt to settle under its own weight the rods can be lengthened until they reach a point where the mass is sufficiently stiff to retain its cavitated shape, but not so far that the mass in contact with the rod is no longer plastic. If extensive hardening of the mass has occurred before it ceases to make contact with the rods the movement of the mass may be retarded and it will be difficult to maintain the normal rate of movement of the sheet. The dragging effect of the rods may be reduced by giving them a slow rotary movement or reciprocating longitudinal movement or both. However, if the rods terminate at a point such that the plastic can be easily deformed by gentle hand pressure, drag will not occur and the walls of the cavities produced will not collapse if the pressure within the cavities is not materially lower than that outside.

The rods may be of circular, rectangular or other desired cross-section, and may have square cut or more or less pointed ends. It is essential that at least the forward portions of the rods from the nip of the rollers onwards should be straight and of uniform cross-section. Where air passages are provided in the rods these may be open to the atmosphere or connected to a source of air or other gas under pressure. For example, drying or curing air or gases may be passed through such passages and thence through the continuous cavities in the sheet.

According to a further feature of the invention the walls of the cavities are reinforced by means of paper, pulp board, cardboard, fabric, net, string, metal foil, mesh wire or the like, applied over or through the rods and carried forward by the plastic. Thus string, paper, ribbon or metal ribbon may be fed through hollow rods and may form a partial or complete lining for the walls of the cavities. Paper ribbon, string, wire or the like may be fed on to the rods as a continuous coil and will bond with the walls of the cavities as these are formed. In another method tubes of flexible reinforcing material are bent from ribbon form into a continuous sheath which moves over the rods at the same rate as the board progresses.

In the accompanying drawings there are shown, more or less diagrammatically, three examples of specific embodiments of apparatus within the purview of the invention useful in the performance of our method, and an example of a product as produced by the method. In the drawings:

Figure 1 is a diagrammatic view, partly in vertical section and partly in elevation, of a plaster board machine operating according to the invention. Figure 2 shows a vertical section of plaster board made on the machine illustrated in Figure 1. Figure 3 is a diagrammatic view partly in vertical section and partly in elevation of a modified form of plaster board machine. Figure 4 shows in side view a prong adapted to feed a liner to the inside of the cavity. Figure 5 is a plan view of Figure 4.

Referring to Figure 1, 1 and 2 are the top and bottom rollers of a plaster board machine each turning in the direction of the arrows; 3 is the bottom liner which is being fed over the bottom roller 2 in the direction of the arrows; 4 is the top liner being fed round the roller 1; 5 is one of a set of prongs or mandrels which form the cavities in the plaster; this is firmly mounted in the sleeve 6, and is provided with the longitudinal passage 7 which permits the free access of air to the cavity. The plaster which is shown shaded is fed from the hopper 8 onto the bottom liner 3, and is shown at 9 being molded into a plaster board. The travel of the liners carries the plaster past the end of the prong leaving a cavity 10 in the plaster board.

Figure 2 shows a plaster board formed in a machine as illustrated in Figure 1, the machine having a set of prongs extending across the space between the rollers; 3 again represents the bottom liner, 4 the top liner, the plaster is the shaded part 9, while the cavities are shown at 10.

Figure 3 illustrates another form of apparatus suitable for operating the invention which permits the plaster to be fed onto the bottom liner without being impeded by the prongs. The numbers refer to the same parts as in Figure 1, the chief difference being that the prong 25 instead of being straight is bent into a right angle, thus permitting the plaster to be fed from the hopper 8 direct onto the band 3. The prong has an air passage 27 and a supporting sleeve 26 performing functions similar to those of the corresponding elements in Figure 1.

Figures 4 and 5 illustrate a modified form of the prong 35, in elevation and plan. This form is designed to supply a paper liner to the inside of the cavity. The end of the prong 35 inserted in the plaster is unmodified and the prong is supported as before by a sleeve 36. At 11 the top of the tube is split open and so shaped that the curve lessens and the width increases until the point 12 is reached where the tube has become a horizontal flat plate. 15 is a former which may optionally be used which is of similar shape to the section 11—12 of the tube 35, and is so placed that there is comfortable room for the paper liner to pass between it and the tube 35. The paper cavity liner 13 is of the exact width necessary to line the inside of the cavity and is wound off the reel 14 and passes between the former 15 and the end 12. The co-operation of the end of the tube and the former bends the liner into a tubular form, the projection 16 being so placed that it depresses one edge of the liner and permits the other edge to lap over it. The liner then passes through the length of prong 35 and emerges inside the cavity 10 where its natural springiness causes it to open slightly and lie against the walls of the cavity. As the plaster sets the liner bonds with it, and this bond to the moving plaster is relied on to draw the liner through the prong. Alternatively, the end of the rod can be shaped as is the former 15 and a shoe placed round it shaped as the section of the rod 11—12. This serves to fold the paper into a tubular shape which passes over the outside of the prong 35 and so into the plaster.

The following example illustrates but does not limit the invention.

*Example*

A plaster mix was employed consisting of plaster of Paris 100 parts, sawdust 3 parts and gum arabic ½ part by weight, and about 65 per cent of water. It had an initial set of about 2½ minutes and a firm or final set of about 7 minutes. This was fed onto the tube system illustrated in Figure 1 above the bottom liner, the two liners moving forward at the rate of about 15 feet per minute.

The tubes projected about 18 ins. beyond the nip between the rolls. The liners drew the plastic past the tubes, through the nip and into the formed board.

The tubes were circular in section and although the mix was still in a soft condition when passing the forward ends of the tubes, perfect cylindrical cavities were formed running the whole length of the board. The latter was cut at about 7 minutes, i. e. after about 100 feet of travel on the board machine. The board then presented the appearance, in cross-section, shown in Figure 2.

The tubes were about ¼ inch diameter and the board about 7/16 inch thick.

In a process as illustrated in the above example any thickness of plaster can be employed, it being quite practical to use a thickness, say, of 2 or 3 inches and cut the resulting board into blocks instead of into sheets; also instead of the single set of tubular prongs several sets can be provided, placed above one another; prongs of different sizes and cross-section can be employed. Further, the prongs can be mounted in the sleeve 6 so as to permit rotation and a slow turning movement imparted to them to make any bonding between the prongs and the plaster more remote. The prongs can also be arranged to reciprocate along their lengths for the same purpose, one suitable adjustment being that the prongs move forward at the same speed as or slower than the plaster and then are pulled back. Also instead of using two liners we can provide only a lower liner, or, particularly when making blocks, the liners can be dispensed with and the plaster supported by one or two travelling supporting bands.

The prong 5 can be modified as shown at 35 in Figure 4 and the cavities lined with paper.

Instead of plaster of Paris we can utilize any plastic which is adaptable to continuous sheeting provided that when in the plastic condition it is not too adhesive to the material of which the rods are made. For instance, among suitable plastics are plastic masses of the water-setting type, such as calcium sulphate plasters, hydraulic cements such as Portland cement, and cements made from blast-furnace slag and calcium sulphate. But the invention may also be employed to form cavities in masses which set in other ways, such as by the cooling of material from a fluid or thin plastic to a solid, of which examples would be foodstuffs such as chocolate, or resins such as synthetic resins.

This invention is a valuable advance in the art as it discloses for the first time a method whereby cavity boards can be made by the exceedingly cheap continuous sheeting process. These central cavities do little to reduce the strength but effectively reduce the weight, save raw material, and improve the thermal and sound insulating properties. With regard to the saving of weight, we can, by placing in an inch thick plaster board cylindrical cavities half an inch in diameter at three quarter inch centres along the centre of the board, reduce the weight by about 27 per cent without undue loss of strength and with a corresponding saving in plaster. Weight for weight cavitated board is considerably stronger than solid board.

Tests carried out on three samples of plaster board each ½ inch thick and having liners of the same material (so-called "baseboard" liner), one of the boards having the normal solid core and the other two having continuous cylindrical cavities extending at right angles to the length of the test pieces gave the following results:

| Type of board | Density in lbs. per sq. foot | Transverse strength | |
|---|---|---|---|
| | | Breaking load in lbs. | Deflection under 10 lbs. load |
| | | | Inches |
| Normal | 2.67 | 85 | 0.012 |
| 7/32 in. cavities at 3/8 in. centres | 2.15 | 55 | 0.026 |
| 19/32 in. cavities at ½ in. centres | 1.81 | 53 | 0.028 |

By way of comparison a normal board 0.35 inch in thickness and of density 1.8 lbs. per sq. foot had a breaking load of 35 lbs. and a deflection of 0.043 in.

The above tests refer to pieces tested in the weak direction of the liner. Some figures for tests in the strong direction of the liner are as follows:

| Type of board | Density, lbs./sq. ft. | Transverse strength | |
|---|---|---|---|
| | | Breaking load in lbs. | Deflection under 10 lbs. load |
| | | | Inches |
| Normal | 2.61 | 105 | 0.023 |
| 19/32 in. cavities at ½ inch centres | 1.81 | 85 | 0.028 |

Using a different quality of liner (so-called "wallboard" liner) the following results were obtained with ½ inch board, the cavities running at right angles to the length of the test pieces.

| Type of board | Density lbs./sq. ft. | Transverse strength | |
|---|---|---|---|
| | | Breaking load in lbs. | Deflection under 10 lbs. load |
| | | | Inches |
| Normal | 2.70 | 90 | 0.025 |
| 7/32 in. cavities at 3/8 in. centres | 2.24 | 70 | 0.018 |
| 19/32 in. cavities at ½ in. centres | 1.86 | 70 | 0.018 |

Another important advantage of the invention in relation to the manufacture of plaster board consists in the greatly increased rate of drying which is possible with boards having continuous cavities. The drying surface exposed is considerably greater than in the case of normal board, e. g. it may be double the area of the normal board. Provided that care is taken that the drying air or gases circulate through the cavities the time required for drying can be very much reduced. Since the drying of plaster board requires expensive equipment an increase of the throughput of the drier represents a considerable saving in capital charges per unit of board made.

The following table gives data obtained in the drying of ½ inch normal baseboard and ½ inch baseboard with 10/32 in. cavities at ½ inch centres, using a drier through which hot air is passed at a velocity of 8 feet per second in each case.

| Type of board | Time in minutes | Proportion of free water evaporated |
|---|---|---|
| Normal (0.537 in. thick) | 0 | 0 |
| | 40 | 38.5 |
| | 80 | 70.8 |
| | 120 | 89.2 |
| | 160 | 97.5 |
| | 200 | 100.0 |
| Cavity (0.490 in. thick) | 0 | 0 |
| | 40 | 76.0 |
| | 80 | 99.0 |
| | 120 | 100.0 |

In the case of the normal board it was estimated as completely dry after 175 minutes and in the case of the cavity board after 90 minutes.

Further saving in the cost of the drying plant required for a given output of board may be effected by undertaking a preliminary drying as the board is being made, by passing drying gases through the continuous cavities.

The invention is not limited to the use of plaster or the like, or to the use of liners, but can be applied generally to the formation of continuous or discontinuous cavities in any plastic material which has a suitable setting or hardening time. In the case of plaster of Paris stable cavities can be formed according to the invention in about 70 seconds from the time of mixing the plaster with water. Using an anhydrite plaster attaining a firm set in about one hour, stable cavities can be formed about 10 minutes from the time of mixing the plaster with water. With thermoplastic materials the initial temperature and rate of cooling can be adjusted to give the requisite hardening time.

With regard to the composition of the rod-shaped structure, smooth-surfaced structures are advantageous because they give easier working, less drag or pull by the plastic, and much less tendency for the plastic to build up on them. Generally we employ a mirror-polished tube. Tubes of glass or metal or synthetic resin such as Bakelite are suitable. For robustness a metal tube is advantageous, and the metal should be such as not to be attacked by the particular composition being employed. Thus a mirror-finished stainless steel tube, or copper-nickel alloy tube is suitable when working with calcium sulphate plasters. We have also found that lubricants on the surface of the tube are helpful, such as water or wax or oil or grease. Having regard to the permanence and perfectly smooth surface of such lubricant we advantageously provide a hard wax.

As many apparently widely different embodiments of this invention may be made without departing from the spirit and scope thereof, it is to be understood that the invention is not limited to the specific embodiments thereof except as defined in the appended claim.

We claim:

1. A continuous method of making cavitated plaster boards and blocks from plaster compositions which are initially fluent but which are capable of setting within a short time to a relatively rigid state, which comprises continuously molding to a slab-like form a mass of fluent plaster composition between spaced traveling forming surfaces while drawing such molded mass over and in a direct contact with a set of small-diameter parallel tubes having polished surfaces of low coefficient of friction with respect to the plaster composition, whereby to form cavities in the mass, and admitting a gas into the tubes and thence into the cavities as they leave the ends of the tubes, to equalize pressure inside and outside the cavities and maintaining the rate of travel of said forming surfaces such that the plaster mass leaving the ends of the tubes is sufficiently self-supporting to prevent collapse thereof.

2. The method of claim 1 wherein the gas is a drying gas and is blown through the tubes and through the cavities to expedite drying of the plaster composition.

3. The method of claim 1 wherein the tubes are rotated during passage of the plaster composition thereover.

4. The method of claim 1 wherein the tubes are reciprocated during passage of the plaster composition thereover.

VICTOR LEFEBURE.
JOHN BRISCOE SANDFORD.